United States Patent
Lin (10) Patent No.: US 9,623,597 B2
(45) Date of Patent: Apr. 18, 2017

(54) GATE STRUCTURE OF OPEN-CHAMBER HOT-RUNNER MOLD

(71) Applicant: Chung-Hsien Lin, Taichung (TW)

(72) Inventor: Chung-Hsien Lin, Taichung (TW)

( * ) Notice: Subject to any disclaimer, the term of this patent is extended or adjusted under 35 U.S.C. 154(b) by 22 days.

(21) Appl. No.: 14/799,085

(22) Filed: Jul. 14, 2015

(65) Prior Publication Data

US 2017/0015034 A1 Jan. 19, 2017

(51) Int. Cl.
*B29C 45/27* (2006.01)
*B29C 45/00* (2006.01)
*B29K 67/00* (2006.01)

(52) U.S. Cl.
CPC ...... *B29C 45/2708* (2013.01); *B29C 45/0025* (2013.01); *B29C 2045/2719* (2013.01); *B29C 2045/2761* (2013.01); *B29C 2045/2766* (2013.01); *B29K 2067/003* (2013.01)

(58) Field of Classification Search
CPC ............ B29C 45/2708; B29C 45/0045; B29C 2045/2719; B29C 2045/2761; B29C 2045/2766
See application file for complete search history.

(56) References Cited

U.S. PATENT DOCUMENTS

| 4,266,723 | A | * | 5/1981 | Osuna-Diaz | ............ B29C 45/30 239/132 |
| 2003/0082263 | A1 | * | 5/2003 | Olaru | ........................ B05B 1/24 425/549 |
| 2009/0220632 | A1 | * | 9/2009 | Haque | ................... B29C 45/278 425/191 |

\* cited by examiner

*Primary Examiner* — Jill Heitbrink (57) ABSTRACT

A hot-runner mold gate structure includes a body having a path, and a room is defined in one end of the path. A guide member is inserted in a bushing, and both of which are located in the room. A locking member is connected to the room and has a reception area in one end of the locking member. The guide member has an axial guide slot and a guide hole. The guide member has a tip which protrudes through an outlet in the distal end of the bushing. Melted PET passes through the guide hole, the guide slot and the gap between the tip and the inside of the outlet to enter into the mold set. The contact area between the locking member and the bushing is minimized to maintain a certain temperature at the outlet of the bushing to avoid the PET from being cooled.

14 Claims, 7 Drawing Sheets

GATE STRUCTURE OF OPEN-CHAMBER HOT-RUNNER MOLD

BACKGROUND OF THE INVENTION

1. Fields of the Invention

The present invention relates to a hot-runner mold gate structure, and more particularly, to an open-chamber hot-runner mold gate structure that has a certain temperature at the tip of the sprue gate so as to avoid the melting Polyethylene Terephthalate (PET) from being in contact with the cold molds.

2. Descriptions of Related Art

The conventional hot-runner mold gate structure known toto applicant comprises a first body with a first path defined axially therein. A second body is detachably connected to the first body and has a second path which communicates with the first path. The second body has a flange which is fixed between the top mold and the bottom mold when a hot-runner mold is connected to a mold set. A sprue gate is located in the second path and engaged with the inner bottom of the second path. The head of the sprue gate protrudes from the second body. A heating unit is mounted to the first and second bodies so as to provide heat to the first and second bodies. A cover is connected to the outside of the heating unit.

Because of dis-continuous injection, the second body has one end thereof adjacent to the inside of the fifth groove of the top mold and the inside of the second cover. The heat generated from the heating unit is transferred to the top mold and the head of the sprue gate via the second body. However, during the heat transferring process, the heat loss happens during the contact between metallic parts, so that the temperature of the area enclosed by the inside of the top mold and the head is less than that of the second body in the heating unit. The temperature of the area is inversely proportional to the distance to the heating unit. Because of the gradually reduced temperature, the PET in the area and located at the inside of the top mold and close to the injection opening is crystalized and solidified to form a white-fog-like layer.

Figure 1:
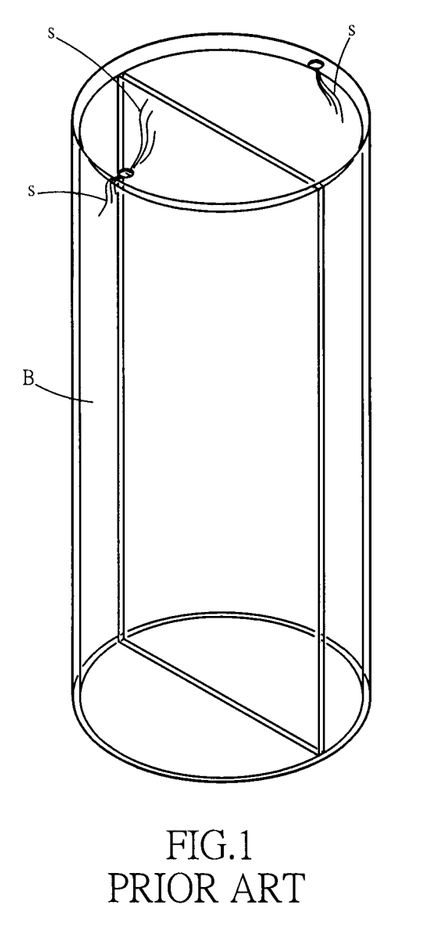
FIG. 1 shows the uneven and ir-regulated traces on the product made by conventional sprue gate structure.

Although the crystalized and solidified white-fog-like layer can be melted again by activating the heating unit so that the following PET can normally be ejected, the crystalized and solidified white-fog-like layer of the PET that is attached one the inside of the mold can only be partially melted. Therefore, the melted material located on outside of the head together with the partially melted crystalized and solidified white-fog-like layer of the PET are ejected by the high pressure. The partially melted crystalized and solidified white-fog-like layer of the PET is ejected into the cavity in the mold set by high pressure, the partially melted crystalized and solidified white-fog-like layer of the PET will flow with the melted PET in the cavity to form uneven and ir-regulated traces "S" on the product "B" as shown in FIG. 1. The product with the traces "S" is deemed as an unqualified product.

The present invention intends to provide am improved open-chamber hot-runner mold gate structure to eliminate the shortcomings mentioned above.

SUMMARY OF THE INVENTION

The present invention relates to a sprue gate structure and comprises a body having a path defined axially therethrough. The path communicates with a room defined in one end of the path. A guide member has a base and a body portion extending from the base. A guide hole is defined through the base, and the body portion has a guide slot, and a tip is formed at the distal end of the body portion. A bushing has a base and a tubular portion extending from the base of the bushing. A chamber is defined axially through the tubular portion and the base of the bushing. The tubular portion has an engagement section and an extension section. The diameter of the extension section is smaller than that of the engagement section. The body portion of the guide member is inserted into the chamber of the bushing. The guide member and the bushing are received in the room of the body. An outlet formed at the distal end of the bushing. The tip of the guide member is located within the outlet. The tip of the guide member does not contact the inner periphery of the outlet.

A locking member is connected with the room and has a flange extending from the outside thereof. A skirt portion extends from the flange. The locking member has a reception area defined axially through the locking member and the skirt portion. The tubular portion of the bushing extends through the reception area. The outside of the engagement section of the tubular portion of the bushing contacts the inner periphery of the reception area. A gap is defined between the outside of the extension section of the tubular portion of the bushing and the inner periphery of the reception area.

The primary object of the present invention is to provide a sprue gate structure wherein there is no direct contact between the outside of the extension section of the tubular portion of the bushing and the inner periphery of the reception area so that a certain temperature is maintained at the outlet of the bushing, therefore, the PET is avoided from being cooled to eliminate the problems of the conventional sprue gate structure.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 4:
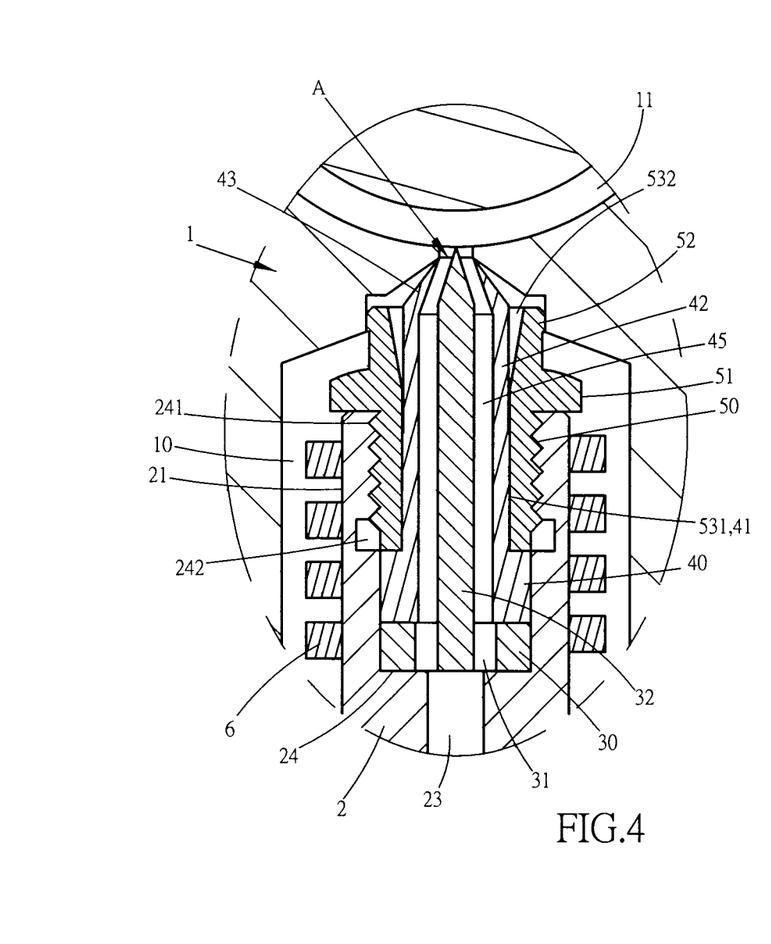
FIG. 4 is an enlarged cross sectional view to show the sprue gate structure of the present invention.
Figure 5:
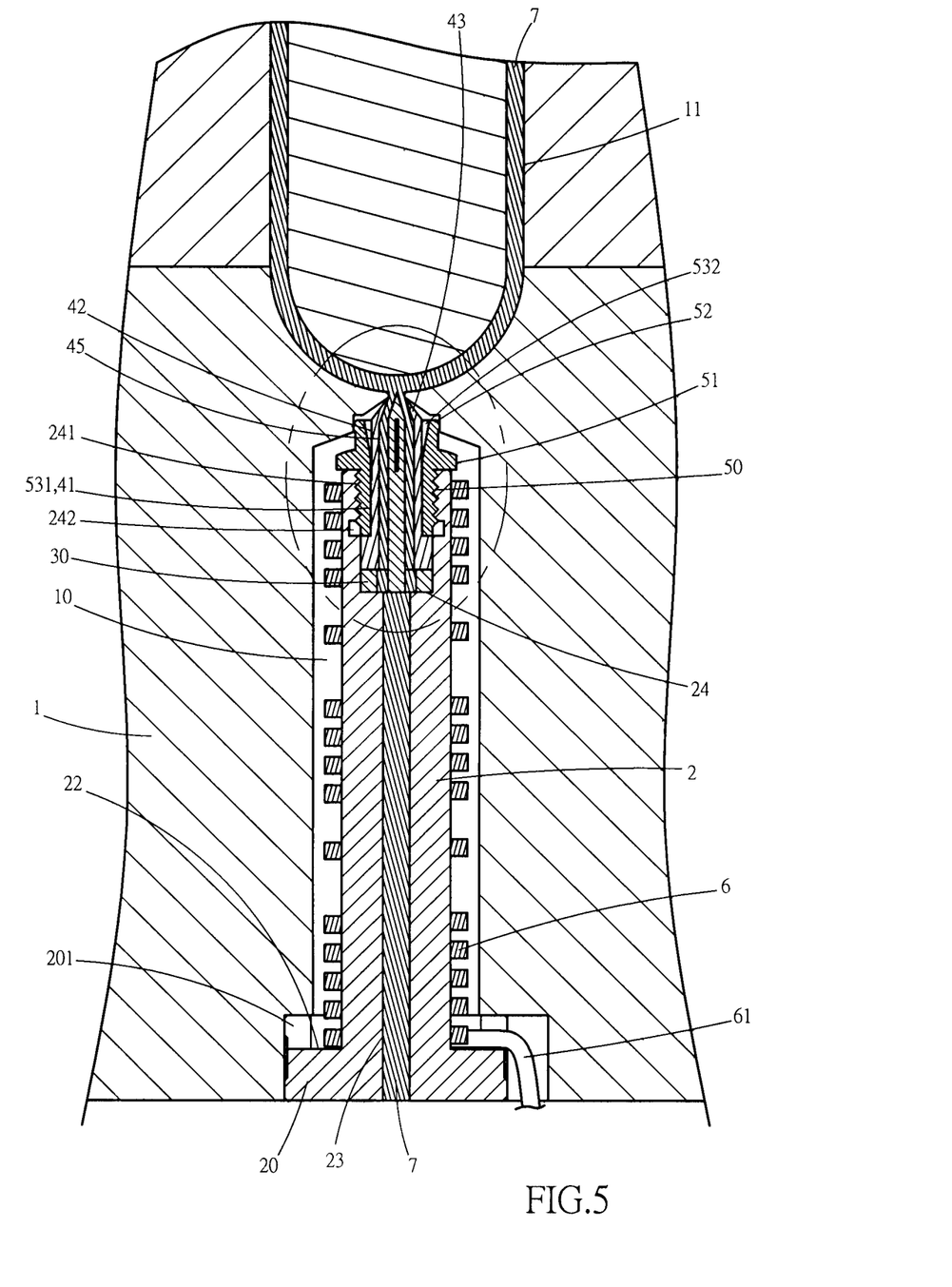
FIG. 5 is an enlarged cross sectional view to show that the sprue gate structure of the present invention is cooperated with a mold set.

Referring to FIGS. 2 to 7, the sprue gate structure of the present invention comprises a body 2 which has a base 20 and a shank 21 extending from the base 20. The base 20 has a peripheral wall extending from the top thereof so as to define an annular groove 22 which encloses the shank 21. A notch 201 is defined in the peripheral wall. As shown in FIG. 5, a heating unit 6 is mounted to the shank 21 and rested in the annular groove 22. A wire of the heating unit 6 passes through the notch 201. A path 23 is defined axially through the shank 21 and the base 20. A room 24 is defined in one end of the path 23 and inner threads 241 are defined in the inner periphery of the room 24, wherein the inner threads 241 are located close to the open end of the body 2. The body 2 is installed in a cavity 10 of a mold set 1.

Figure 2:
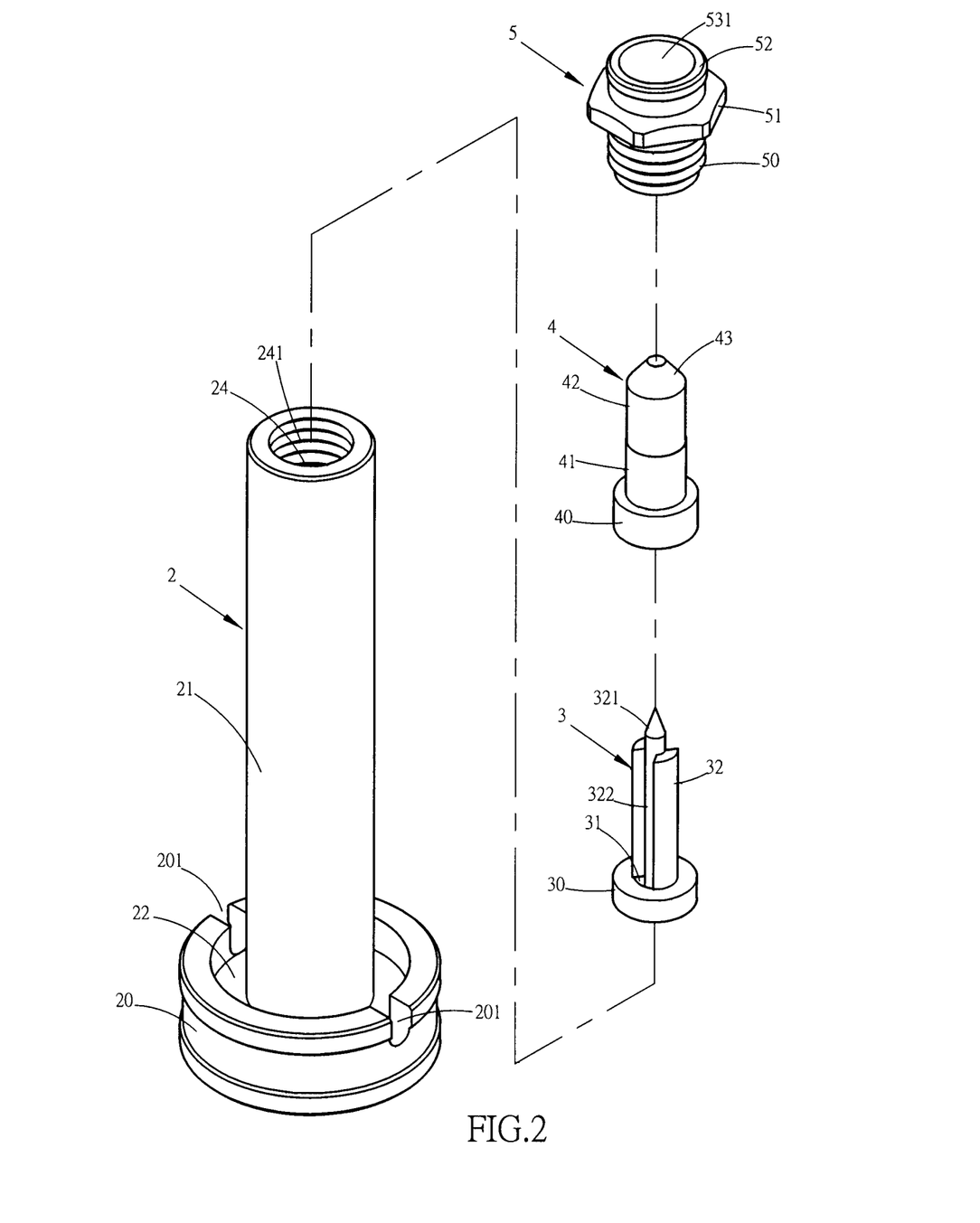
FIG. 2 is an exploded view of the sprue gate structure of the present invention.
Figure 3:
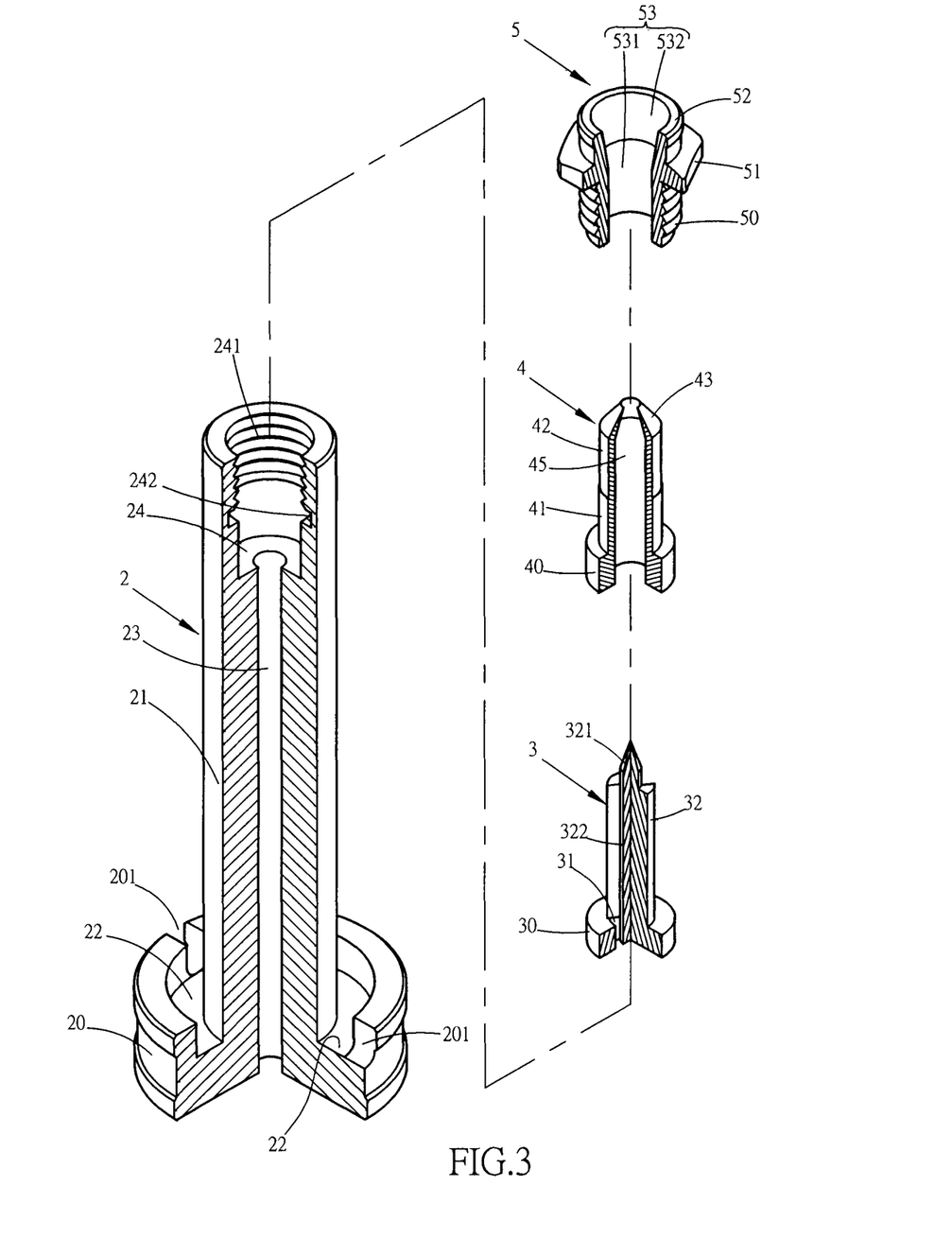
FIG. 3 shows the partial cross sectional view of the parts of the sprue gate structure of the present invention.

A guide member 3 has a base 30 and a body portion 32 extending from the base 30. A guide hole 31 is defined through the base 30, and the body portion 32 has a tip 321 at the distal end thereof. The body portion 32 of the guide member 3 has at least one guide slot 322 defined along the outside thereof. The at least one guide slot 322 communicates with the guide hole 31.

A bushing 4 has a base 40 and a tubular portion extending from the base 40 of the bushing 4. A chamber 45 is defined axially through the tubular portion and the base 40 of the bushing 4. The tubular portion has an engagement section 41 and an extension section 42 which share a common axis with the engagement section 41. The diameter of the extension section 42 is smaller than that of the engagement section 41. A shoulder is formed between the engagement section 41 and the extension section 42 of the tubular portion of the bushing 4. The diameter of the distal end 43 of the extension section 42 is gradually reduced and toward the center of the bushing 4 so as to form an arrowhead-like distal end 43. The body portion 32 of the guide member 3 is inserted into the chamber 45 of the bushing 4. Both of the guide member 3 and the bushing 4 are received in the room 24 of the body 2. An outlet "A" is formed at the center of the distal end 43 of the bushing 4, and the tip 321 of the guide member 3 is located within the outlet "A". The tip 321 of the guide member 3 does not contact the inner periphery of the outlet "A" located above the chamber 45 as shown in FIG. 4.

A locking member 5 has outer threads 50 formed on the outside thereof, the outer threads 50 are connected with the inner threads 241 to connect the locking member 5 to the body 2. The locking member 5 has a flange 51 extending from the outside thereof and a skirt portion 52 extends from the flange 51. The locking member 5 has a reception area 53 defined axially through the locking member 5 and the skirt portion 52. Specifically, the reception area 53 has a first partition 531 and a second partition 532, and the tubular portion of the bushing 4 extends through the reception area 53. The second partition 532 is a tapered hole, or the diameter of the second partition 532 is larger than that of the first partition 531 so as to form a stepped area. The outside of the engagement section 41 of the tubular portion of the bushing 4 directly contacts the inner periphery of first partition 531 of the reception area 53, while a gap is defined between the outside of the extension section 42 of the tubular portion of the bushing 4 and the inner periphery of the second partition 532 of the reception area 53. The contact area between the engagement portion 41 of the bushing 4 and the locking member 5 is minimized. The heat conduction between the bushing 4 and the locking member 5 is minimized, so that the temperature between the extension portion 42 and the tip 321 of the guide member 31 is slightly reduced or close to the temperature of the heating unit 6, such that the PET 7 close to the outlet "A" does not have the crystalized and solidified white-fog-like layer.

Figure 6:
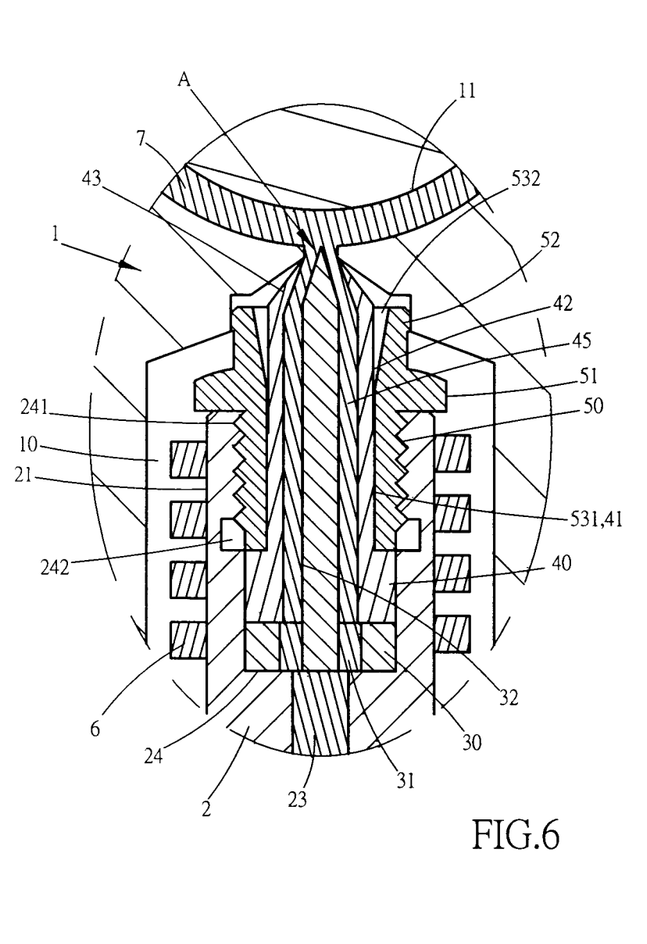
FIG. 6 shows that the melted PET is injected into the cavity of the mold set via the sprue gate structure of the present invention.
Figure 7:
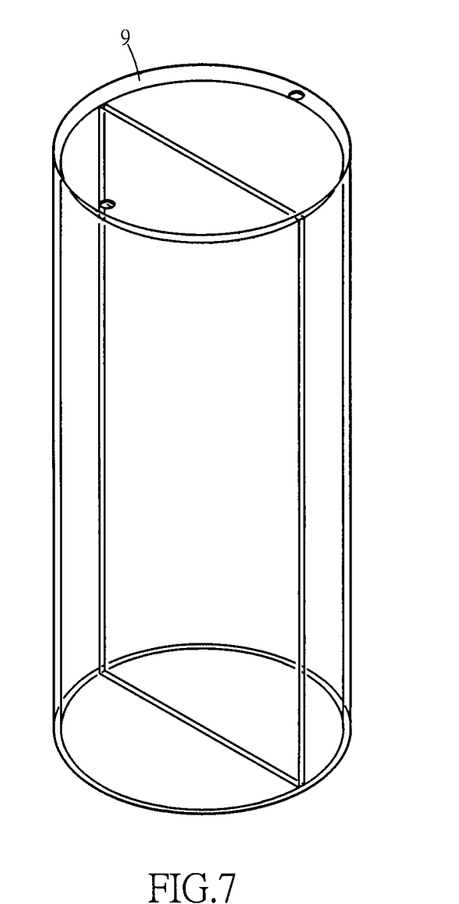
FIG. 7 shows the product made by using the sprue gate structure of the present invention.

When in use, the melted PET 7 is delivered from a machine (not shown) into the path 23 of the body 2, and the melted PET flows through the guide hole 31 and the guide slot 322 of the guide member 3, and then flows into the chamber 45 of the bushing 4. The melted PET eventually flows into the cavity 11 of the mold set 1 via the outlet "A" of the bushing 4 as shown in FIGS. 5 and 6. Because the outside of the engagement section 41 of the tubular portion of the bushing 4 directly contacts the inner periphery of first partition 531 of the reception area 53, while a gap is defined between the outside of the extension section 42 of the tubular portion of the bushing 4 and the inner periphery of the second partition 532 of the reception area 53. Therefore, during the process, the heating unit 6 generates high temperature and the heat is directly delivered to the body 2, the guide member 3, the bushing 4 and the locking member 5. Because the guide member 3, the bushing 4 and the locking member 5 are compact so that the heat loss reduces, the temperature in the chamber 45 between the guide member 3 and the extension portion 42 of the bushing 4 is only slightly lower than that of the body 2. Besides, the melted PET 7 is located in the chamber 45 between the guide member 3 and the bushing 4, so that the melted PET 7 does not contact the mold set 1. That is to say, the temperature of the heat slightly drops when being conducted by the extension portion 42 of the bushing 4, so that the temperature of the extension portion 42 is slightly lower than that of the body 2. The melted PET 7 in the chamber 45 corresponding to the extension portion 42 or in the outlet "A" is stilled maintained at a certain temperature which keeps the PET from being cooled to form a crystalized and solidified white-fog-like layer of the PET 7. Therefore, there will be no crystalized and solidified white-fog-like layer of the PET 7 being injected into the cavity 11 of the mold set 1. Therefore, as shown in FIG. 7, no uneven and ir-regulated traces formed on the product 9.

Figure 8:
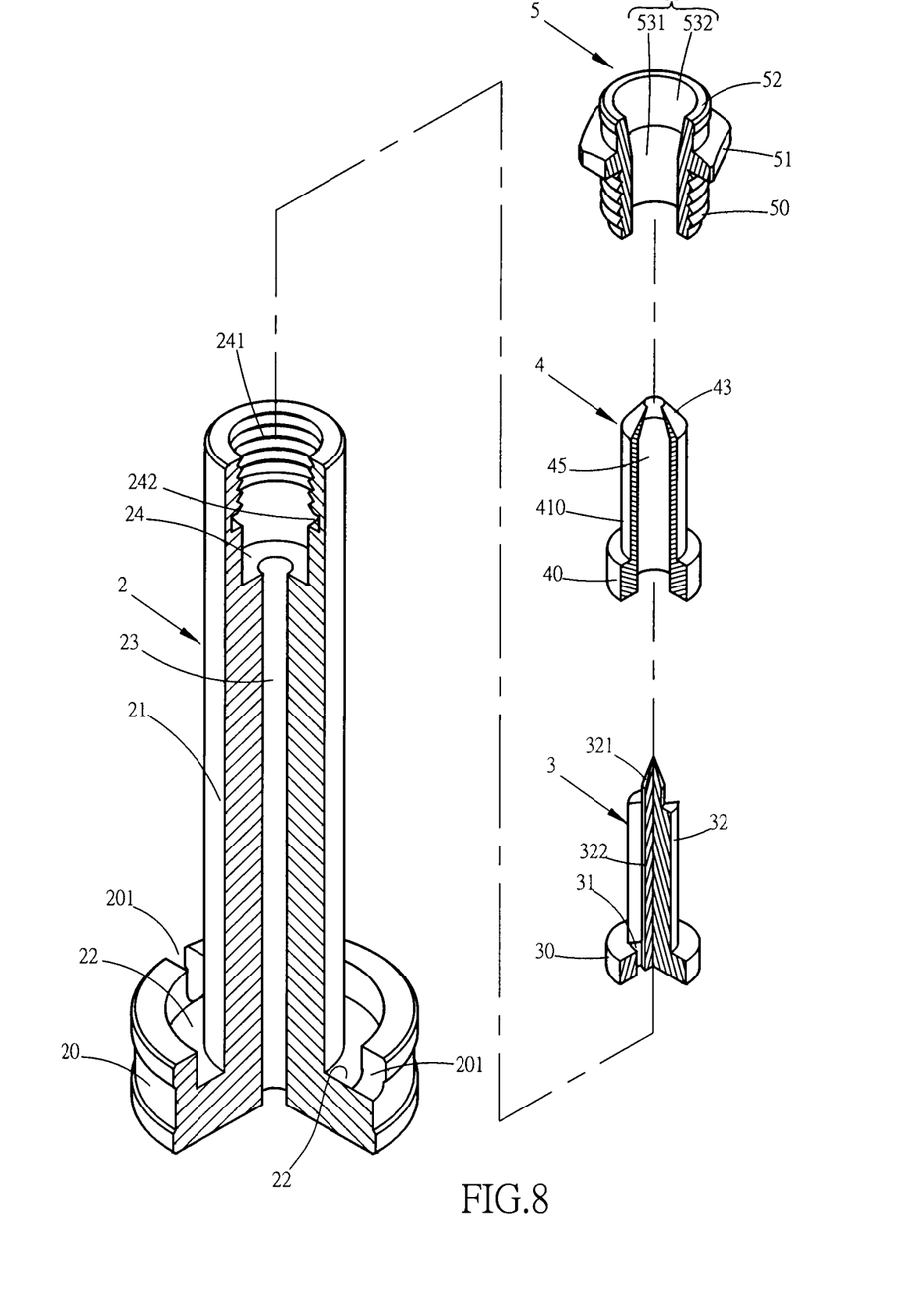
FIG. 8 is an exploded view to show the second embodiment of the bushing of the sprue gate structure of the present invention.
Figure 9:
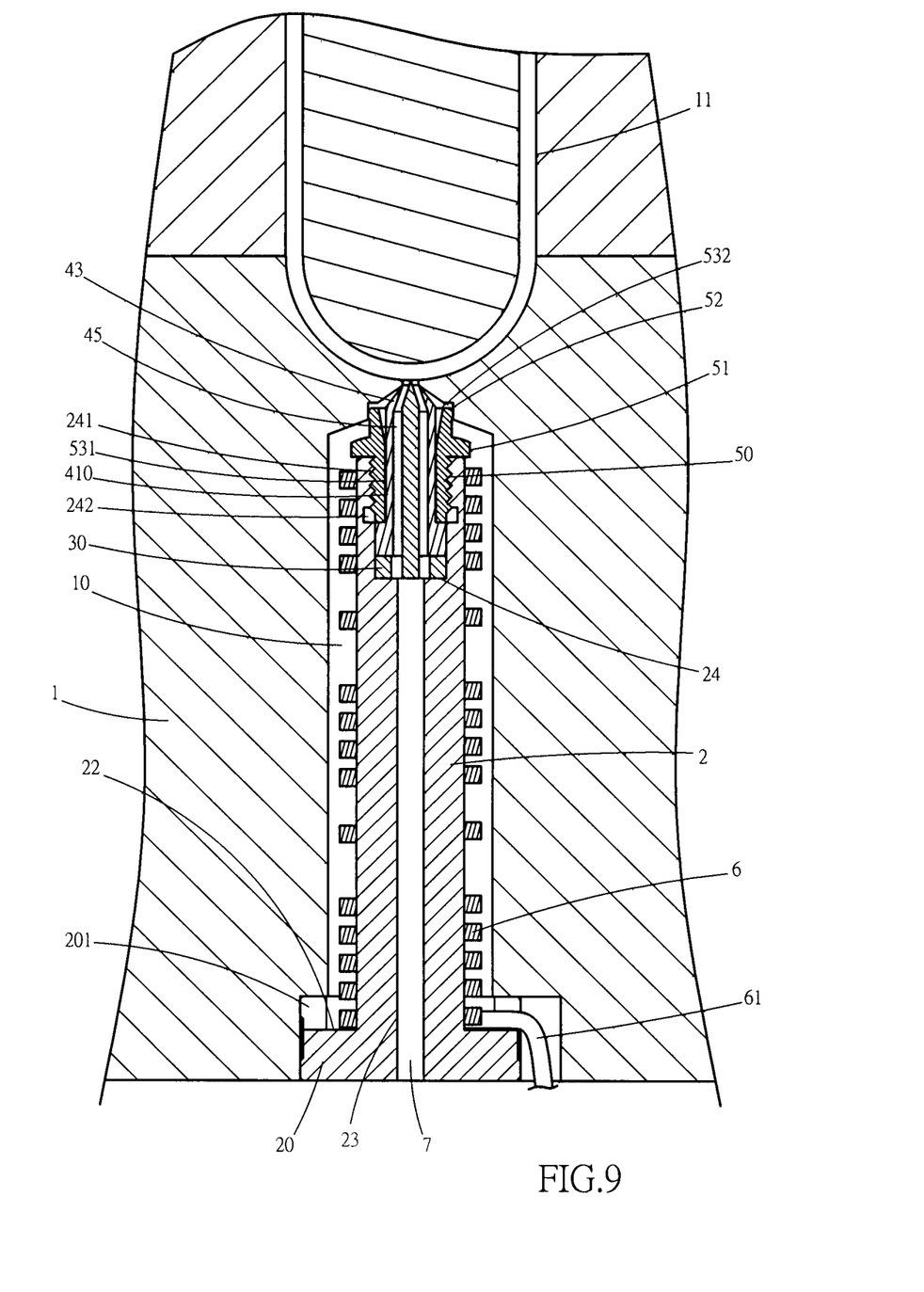
FIG. 9 is an enlarged cross sectional view to show that the sprue gate structure of the present invention with the second embodiment of the bushing is cooperated with a mold set.

FIGS. 8 and 9 show the second embodiment of the bushing 4, wherein the tubular portion 410 of the bushing 4 has an identical diameter. The tubular portion has a lower section extending from the base 30, and an upper section connected to the lower section. Therefore, when the tubular portion 410 of the bushing 4 is inserted into the reception area 53 of the locking member 5, an annular gap is formed between the upper section of the tubular portion 410 and the second partition 532, and the lower section of the tubular portion 410 is in contact with the first partition 531. The same feature as the previous embodiment is obtained.

While we have shown and described the embodiment in accordance with the present invention, it should be clear to those skilled in the art that further embodiments may be made without departing from the scope of the present invention.

What is claimed is:
1. A hot-runner mold gate structure comprising:
a body having a path defined axially therethrough, a room defined in one end of the path and inner threads defined in an inner periphery of the room, the inner threads located close to an open end of the body;
a guide member having a base and a body portion extending from the base, a guide hole defined through the base, the body portion having a tip at a distal end thereof;
a bushing having a base and a tubular portion extending from the base of the bushing, a chamber defined axially through the tubular portion and the base of the bushing, the tubular portion having an engagement section and an extension section which shares a common axis with the engagement section, a diameter of the extension section being smaller than that of the engagement section, the body portion of the guide member inserted into the chamber of the bushing, the guide member and the bushing received in the room of the body, a diameter of a distal end of the extension section being reduced and tapered toward a center of the bushing so as to form an arrowhead-like distal end, an outlet defined in a center of the distal end of the extension section of the bushing, the tip of the guide member located within the outlet, the tip of the guide member being not in contact with an inner periphery of the outlet, and a locking member having outer threads formed on an outside thereof, the outer threads being connected with the inner threads to connect the locking member to the body, the locking member having a flange extending from the outside thereof and a skirt portion extending from the flange, the locking member having a reception area defined axially through the locking member and the skirt portion, the reception area having a first partition and a second partition, the tubular portion of the bushing extending through the reception area, an outside of the engagement section of the tubular portion of the bushing contacting an inner periphery of the reception area at the first partition, a gap defined between an outside of the extension section of the tubular portion of the bushing and the inner periphery of the second partition of the reception area.

2. The hot-runner mold gate structure as claimed in claim 1, wherein a shoulder is formed between the engagement section and the extension section of the tubular portion of the bushing.

3. The hot-runner mold gate structure as claimed in claim 2, wherein the outside of the extension section is tapered toward the tip portion of the bushing.

4. The hot-runner mold gate structure as claimed in claim 1, wherein the body portion of the guide member has at least one guide slot defined along an outside thereof, the at least one guide slot communicates with the guide hole.

5. The hot-runner mold gate structure as claimed in claim 2, wherein the body portion of the guide member has at least one guide slot defined along an outside thereof, the at least one guide slot communicates with the guide hole.

6. The hot-runner mold gate structure as claimed in claim 3, wherein the body portion of the guide member has at least one guide slot defined along an outside thereof, the at least one guide slot communicates with the guide hole.

7. The hot-runner mold gate structure as claimed in claim 1, wherein the body has a base and a shank extending from the base, the base has a peripheral wall extending from a top thereof so as to define an annular groove which encloses the shank, a notch is defined in the peripheral wall, a heating unit is mounted to the shank and rested in the annular groove, a wire of the heating unit passes through the notch.

8. A hot-runner mold gate structure comprising:
a body having a path defined axially therethrough, a room defined in one end of the path and inner threads defined in an inner periphery of the room, the inner threads located close to an open end of the body;
a guide member having a base and a body portion extending from the base, a guide hole defined through the base, the body portion having a tip at a distal end thereof;

a bushing having a base and a tubular portion extending from the base of the bushing, a chamber defined axially through the tubular portion and the base of the bushing, the tubular portion having an identical diameter, the tubular portion having a lower section extending from the base, and an upper section connected to the lower section, the body portion of the guide member inserted into the chamber of the bushing, the guide member and the bushing received in the room of the body, an outlet formed at a distal end of the tubular portion of the bushing, the tip of the guide member located within the outlet, the tip of the guide member being not in contact with an inner periphery of the outlet, and a locking member having outer threads formed on an outside thereof, the outer threads being connected with the inner threads to connect the locking member to the body, the locking member having a flange extending from the outside thereof and a skirt portion extending from the flange, the locking member having a reception area defined axially through the locking member and the skirt portion, the reception area having a first partition and a second partition, the tubular portion of the bushing extending through the reception area, an outside of a lower section of the tubular portion of the bushing contacting an inner periphery of first partition of the reception area, a gap defined between an outside of an upper section of the tubular portion of the bushing and an inner periphery of the second partition of the reception area.

9. The hot-runner mold gate structure as claimed in claim 8, wherein the inner periphery of the second partition expands outward toward a direction opposite to the first partition so as to form the gap defined between the outside of the upper section of the tubular portion of the bushing and the inner periphery of the second partition of the reception area.

10. The hot-runner mold gate structure as claimed in claim 8, wherein a diameter of the second partition is larger than that of the first partition so as to form the gap defined between the outside of the upper section of the tubular portion of the bushing and the inner periphery of the second partition of the reception area.

11. The hot-runner mold gate structure as claimed in claim 6, wherein the body portion of the guide member has at least one guide slot defined along an outside thereof, the at least one guide slot communicates with the guide hole.

12. The hot-runner mold gate structure as claimed in claim 7, wherein the body portion of the guide member has at least one guide slot defined along an outside thereof, the at least one guide slot communicates with the guide hole.

13. The hot-runner mold gate structure as claimed in claim 8, wherein the body portion of the guide member has at least one guide slot defined along an outside thereof, the at least one guide slot communicates with the guide hole.

14. The hot-runner mold gate structure as claimed in claim 8, wherein the body has a base and a shank extending from the base, the base has a peripheral wall extending from a top thereof so as to define an annular groove which encloses the shank, a notch is defined in the peripheral wall, a heating unit is mounted to the shank and rested in the annular groove, a wire of the heating unit passes through the notch.

* * * * *